June 22, 1926.
B. D. WELLS
1,589,913
METHOD AND MOLDS FOR MAKING ELECTRIC SOCKETS
Original Filed Sept. 10, 1923
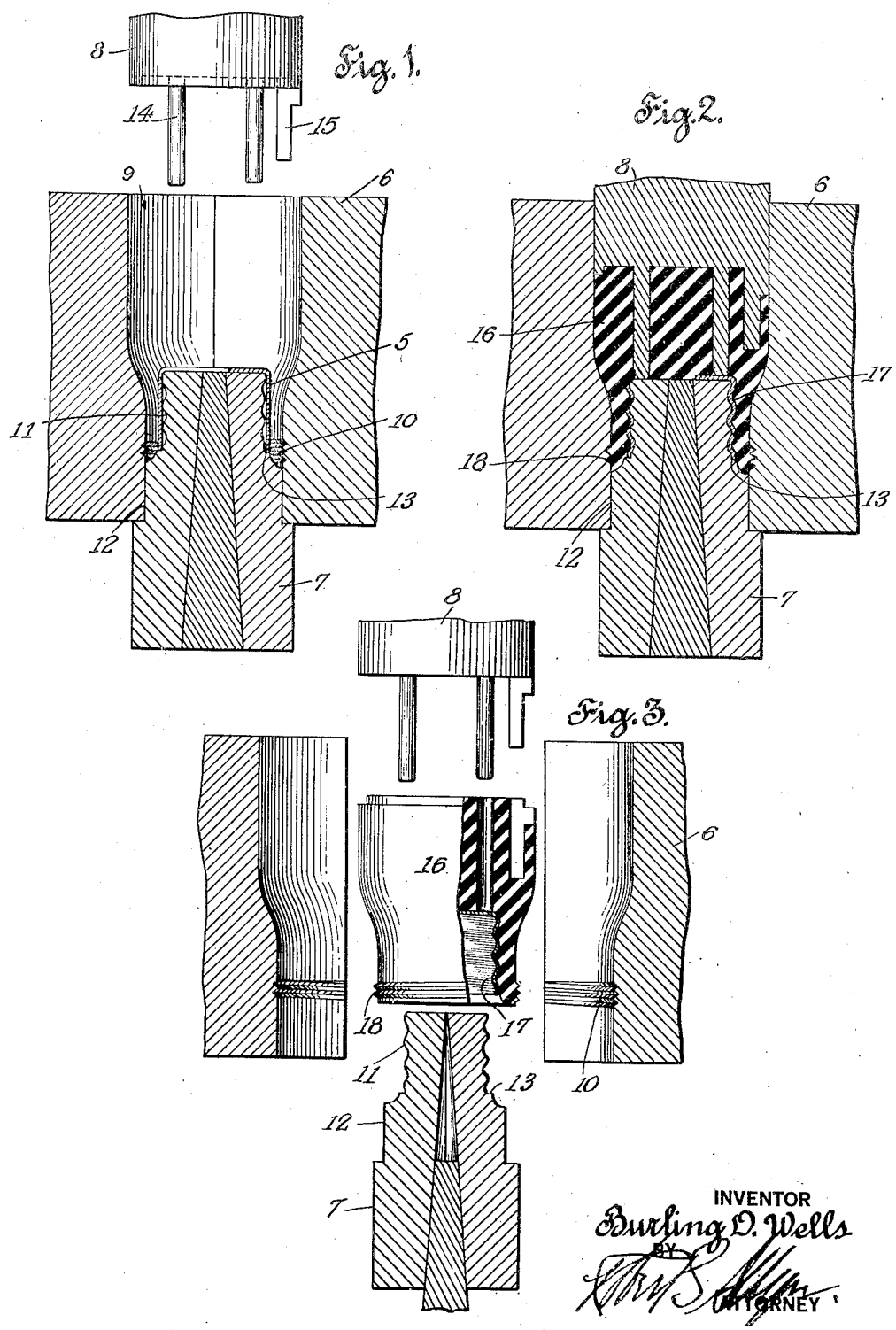
INVENTOR
Burling D. Wells
BY
ATTORNEY Patented June 22, 1926.

1,589,913

UNITED STATES PATENT OFFICE.

BURLING D. WELLS, OF DANBURY, CONNECTICUT, ASSIGNOR TO MOLDED SOCKET CORPORATION, OF NEWARK, NEW JERSEY, A CORPORATION OF NEW JERSEY.

METHOD AND MOLDS FOR MAKING ELECTRIC SOCKETS.

Original application filed September 10, 1923, Serial No. 661,758. Divided and this application filed September 15, 1925. Serial No. 56,418.

The main object of my invention is to provide a simple and reliable method of forming a socket for electric lamps and the like.

Another object is to provide molds for forming such sockets rapidly and uniformly and at a minimum expense.

In carrying out my invention I provide molds or dies for holding a metal cup and compressing into such dies an insulating composition so as to simultaneously thread the metal sleeve or cup and form the body of the socket.

This application is a division from 661,758 filed September 10, 1923.

Fig. 1 is a vertical sectional view showing a set of molds or dies with a blank in position to be threaded and incorporated in the socket as the socket is formed from a molding composition.

Fig. 2 is a similar view of the molds showing a completed socket body.

Fig. 3 is a sectional view showing the parts of the molds and the completed socket separated.

In molding sockets from insulating material I have found it advantageous to use a straight sided blank 5 to produce the screw shell contact rather than to use a preformed screw shell. The straight sided blanks are a great deal cheaper to manufacture and easier to handle, and give results fully as good as can be obtained with a preformed blank. The dies or molds consist of three members, viz: the sectional lateral member 6, the expansible lower die 7, and the punch 8.

The recess 9 is shaped according to the desired external design of the socket body, and may have a screw thread 10.

The die 7 is formed of a number of parts so that it may be expanded and collapsed. The upper end is threaded at 11 according to the screw thread desired to be formed in the shell. This die 7 is centered at 12 in the lateral die 6.

The punch 8 is shaped at its lower end so as to form such recesses and passages as may be desired in the insulating body.

To mold the socket I drop a blank 5 over the collapsible piston or mandrel 7. The blank 5 rests on the upper end of the mandrel while its side wall has an appreciable clearance from the high points of the threads 11 and its lower edge rests tightly against a shoulder or ledge 13 on the mandrel to prevent entrance of the molding material between the screw shell blank and the mandrel. The mandrel is inserted between the multi-part female die 6. The molding composition is then poured or pushed into the mold and the male die 8 provided with extensions such as 14 and 15 to produce any desired recesses in the body portion is applied to the top of the molding composition under pressure. The cylindrical blank 5 is thus pressed tightly against the threads on the mandrel during this operation and taking their shape is permanently molded into the socket. The male die is then withdrawn from the top, leaving the molded socket 16, as shown in Fig. 2. The mandrel is then collapsed and withdrawn from the bottom of the socket as shown in Fig. 3, and upon separation of the parts of the mold the body portion of the socket is complete. The molding of the thread 17 in the screw shell and the provision of a lamp shade holder thread 18 during the molding operation result in marked economy in manufacturing molded sockets.

Obviously the body may be subsequently baked as desired.

This method eliminates the separate operation by which the shell 5 is usually threaded. Furthermore the forming of the thread by the pressure on and through the molding composition stirs up the composition and ensures a more uniform mixture and smooth finish.

I claim:

1. The method of producing a lamp socket body which comprises supporting a cylindrical metal blank on a screw threaded mandrel at one end of a die, compressing molding composition about the blank until the blank takes the shape of the mandrel and withdrawing the mandrel and socket from the die.

2. The method of producing a lamp socket body which comprises placing a threadless metal blank on a screw threaded mandrel at one end of a die, compressing cold moldable insulation about the blank until it receives the threaded shape of the mandrel, removing the molded material from the die and mandrel, and baking the molded material.

3. The method of producing a lamp socket which comprises placing a screw threaded mandrel in one end of a multi part female die having a tapering portion connecting a large and a small cylindrical portion, the small cylindrical portion being undercut, next compressing insulating composition between the mandrel and die to form a socket having a molded shade holding member on the outside of its neck, and then separating the die and removing the mandrel from the socket.

4. Molds for forming a socket body comprising lateral sections having die faces for forming the outer wall of a socket body, an expansible member formed of a plurality of parts and divided with an exterior threaded wall and means for supporting and centering a cup shaped metal blank and a punch member for forcing molding composition into the space between said lateral sections and simultaneously threading said blank.

5. Molds for forming an electric socket body comprising lateral sections having adjacent facings designed to shape the exterior wall of a socket body and provided with screw threads near one end, an expansible inner die having exterior threads, means for centering said die in said sections and a punch member for forcing a molding composition into said sections and about a blank supported on said die and simultaneously forming an exteriorly threaded body and an interiorly threaded screw shell.

BURLING D. WELLS.